US008108169B2

(12) United States Patent
Martin

(10) Patent No.: US 8,108,169 B2
(45) Date of Patent: Jan. 31, 2012

(54) METHOD AND APPARATUS FOR MATCHING TRANSLUCENT COATINGS OF ABSORBENT SUBSTRATES

(75) Inventor: Denis Martin, Dietlikon (CH)

(73) Assignee: Datacolor Holding AG, Lucerne (CH)

( * ) Notice: Subject to any disclaimer, the term of this patent is extended or adjusted under 35 U.S.C. 154(b) by 483 days.

(21) Appl. No.: 12/413,190

(22) Filed: Mar. 27, 2009

(65) Prior Publication Data

US 2009/0248338 A1 Oct. 1, 2009

Related U.S. Application Data

(60) Provisional application No. 61/040,590, filed on Mar. 28, 2008.

(51) Int. Cl.
G01J 3/46 (2006.01)
G01J 3/00 (2006.01)
G06F 19/00 (2011.01)
G06F 17/40 (2006.01)

(52) U.S. Cl. ........ 702/84; 73/150 R; 73/865.8; 118/712; 250/559.01; 356/72; 356/402; 702/1; 702/127; 702/187; 702/189

(58) Field of Classification Search ................ 73/150 R, 73/432.1, 865.8; 118/663, 668, 676, 679, 118/688, 689, 712, 713; 250/200, 336.1, 250/358.1, 559.01; 356/72, 300, 319, 326, 356/402, 405, 406, 432; 702/1, 81, 84, 127, 702/187, 189; 708/100, 105, 131, 160, 200, 708/800, 801

See application file for complete search history.

(56) References Cited

U.S. PATENT DOCUMENTS

| | | | | | |
|---|---|---|---|---|---|
| 2,774,276 | A | * | 12/1956 | Glasser et al. | 356/405 |
| 2,882,786 | A | * | 4/1959 | Kaye | 356/406 |
| 3,003,388 | A | * | 10/1961 | Hunter et al. | 356/405 |
| 3,065,350 | A | * | 11/1962 | Graner | 250/303 |
| 3,159,742 | A | * | 12/1964 | Davidson | 382/165 |
| 3,314,327 | A | * | 4/1967 | Killpatrick et al. | 356/323 |
| 3,389,265 | A | * | 6/1968 | Schreckendgust | 250/226 |
| 3,406,293 | A | * | 10/1968 | Mowry | 250/226 |
| 3,531,208 | A | * | 9/1970 | Ward | 356/405 |
| 6,502,049 | B1 | * | 12/2002 | Takada et al. | 702/104 |
| 6,934,026 | B2 | | 8/2005 | McDonald et al. | |
| 7,042,556 | B1 | | 5/2006 | Sun | |

(Continued)

OTHER PUBLICATIONS

H.S. Sha, et al., "Kubelka-Munk Analysis of Absorptance in the Presence of Scattering Including Surface-Reflection Correction to Transmittance," Color Research and Application, vol. 10 (1985), pp. 26-31.

(Continued)

Primary Examiner — Edward Cosimano

(57) ABSTRACT

In one embodiment, the present invention is a method and apparatus for matching translucent coatings of absorbent substrates. In one embodiment, a method for matching a color of a sample includes generating a plurality of recipes, each of the recipes representing a mixture of one colorant and a clear vehicle and defining a concentration of the one colorant and a concentration of the clear vehicle, applying each of the recipes to one or more absorbent substrates, determining an absorption value and a scattering value for each of the recipes as applied to the absorbent substrates, storing the recipes in a database, where each of the recipes is stored with an associated absorption value and an associated scattering value, selecting a first recipe from among the recipes stored in the database, and evaluating a quality of the first recipe as a match to the color of the sample.

20 Claims, 4 Drawing Sheets

U.S. PATENT DOCUMENTS

| | | | |
|---|---|---|---|
| 7,116,420 B2 | 10/2006 | Skierski | |
| 7,158,672 B2 * | 1/2007 | Johansson et al. | 382/167 |
| 7,466,415 B2 * | 12/2008 | Gibson et al. | 356/402 |
| 7,623,241 B2 * | 11/2009 | Brini et al. | 356/408 |
| 7,756,328 B2 * | 7/2010 | Komiya et al. | 382/164 |
| 7,995,838 B2 * | 8/2011 | Komiya et al. | 382/162 |
| 2003/0151611 A1 * | 8/2003 | Turpin et al. | 345/589 |
| 2003/0156752 A1 * | 8/2003 | Turpin et al. | 382/162 |
| 2003/0158617 A1 * | 8/2003 | Turpin et al. | 700/97 |
| 2003/0158788 A1 * | 8/2003 | Turpin et al. | 705/26 |
| 2003/0174882 A1 * | 9/2003 | Turpin et al. | 382/162 |
| 2004/0131756 A1 * | 7/2004 | Skierski et al. | 427/8 |
| 2004/0252883 A1 * | 12/2004 | Johansson et al. | 382/162 |
| 2006/0181707 A1 * | 8/2006 | Gibson et al. | 356/402 |
| 2006/0250668 A1 * | 11/2006 | Komiya et al. | 358/504 |
| 2008/0015791 A1 * | 1/2008 | Brini et al. | 702/23 |
| 2010/0232688 A1 * | 9/2010 | Komiya et al. | 382/162 |

OTHER PUBLICATIONS

ASTM International, D 2244-07, "Standard Practice for Calculation of Color Tolerances and Color Differences from Instrumentally Measured Color Coordinates," pp. 1-10.

* cited by examiner

METHOD AND APPARATUS FOR MATCHING TRANSLUCENT COATINGS OF ABSORBENT SUBSTRATES

CROSS REFERENCE TO RELATED APPLICATIONS

This application claims the benefit of expired U.S. Provisional Patent Application Ser. No. 61/040,590, filed Mar. 28, 2008, which is herein incorporated by reference in its entirety.

FIELD OF THE INVENTION

The present invention generally relates to the field of coatings, and more specifically relates to translucent coatings for absorbent substrates.

BACKGROUND OF THE DISCLOSURE

Two challenging problems in applications involving translucent coatings such as wood stains are: (1) the variation of the colorant-mixture rule with the absorbent substrate (e.g., type of wood) on which the translucent coatings is applied; and (2) the requirement that the texture (e.g., wood grain) of the absorbent substrate be visible through the translucent coating within a prescribed contrast. For instance, if the colorant-formulation algorithm is left unconstrained and asked for a match to the type of absorbent substrate, the result might be an opaque layer with the right "average" reflectance but with no texture left visible.

SUMMARY OF THE INVENTION

In one embodiment, the present invention is a method and apparatus for matching translucent coatings of absorbent substrates. In one embodiment, a method for matching a color of a sample includes generating a plurality of recipes, each of the recipes representing a mixture of one colorant and a clear vehicle and defining a concentration of the one colorant and a concentration of the clear vehicle, applying each of the recipes to one or more absorbent substrates, determining an absorption value and a scattering value for each of the recipes as applied to the absorbent substrates, storing the recipes in a database, where each of the recipes is stored with an associated absorption value and an associated scattering value, selecting a first recipe from among the recipes stored in the database, and evaluating a quality of the first recipe as a match to the color of the sample.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the invention provides a method and apparatus for matching translucent coatings for absorbent substrates, such as wood stains. In one embodiment, the coatings comprise one or more colorants suspended in a clear vehicle (e.g., a binder). One embodiment of the invention comprises a three-stage process including two calibration stages and one matching stage.

Figure 1:
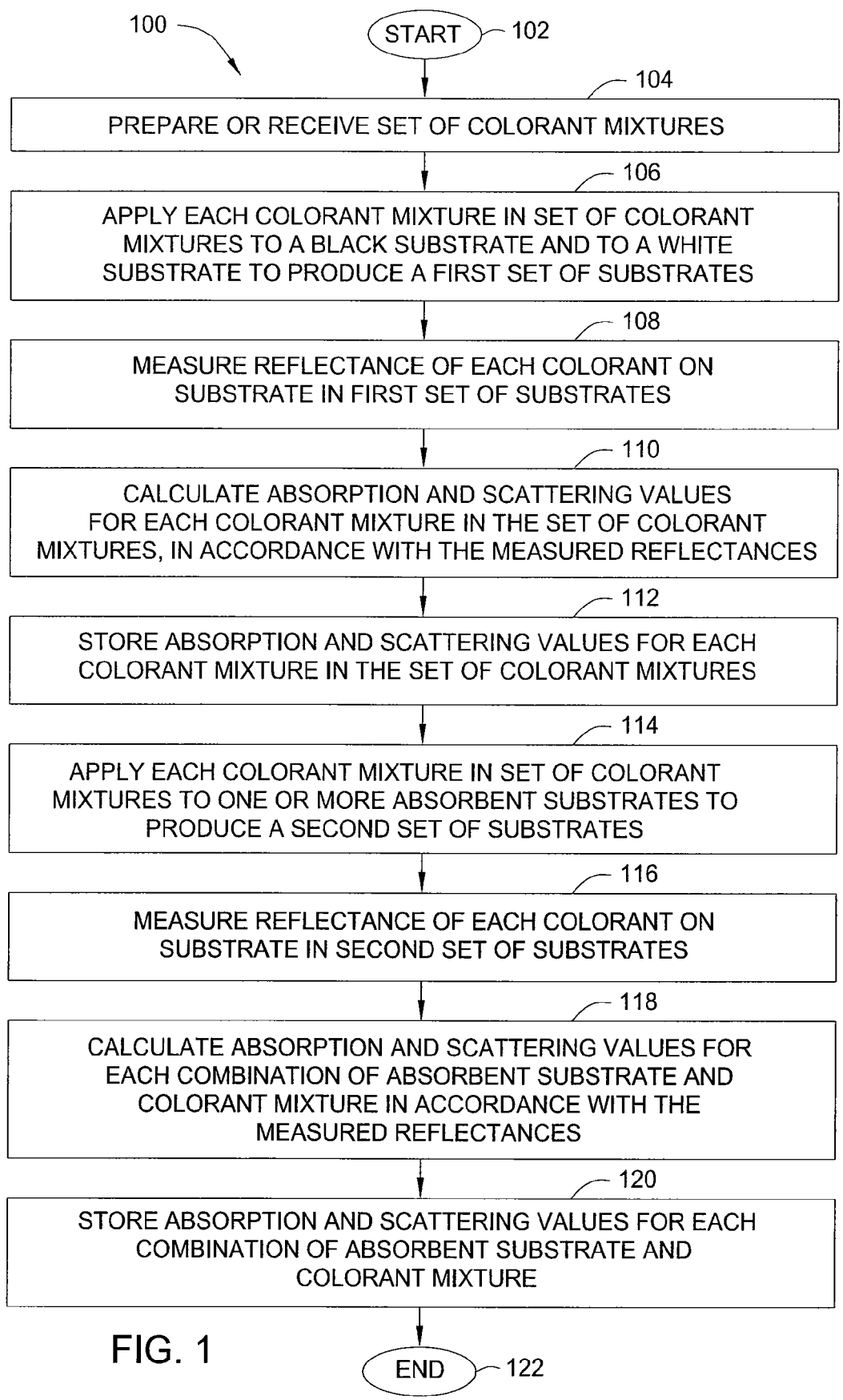
FIG. 1 is a flow diagram illustrating one embodiment of a method for calibrating a system that matches translucent coatings, according to the present invention.

FIG. 1 is a flow diagram illustrating one embodiment of a method 100 for calibrating a system that matches translucent coatings, according to the present invention. The method 100 is initialized at step 102 and proceeds to step 104, where the method 100 prepares or receives a set of colorant mixtures. In one embodiment, each of the colorant mixtures in the set of colorant mixtures comprises a mixture of two or more of the following: a clear vehicle, a white colorant, a black colorant, and a plurality of different chromatic (i.e., neither white nor black) colorants. The composition of a colorant mixture, including the specific colorant components and concentrations thereof, is referred to as the colorant mixture's "recipe."

In a further embodiment, the set of colorant mixtures includes one or more white colorant-based mixtures, one or more black colorant-based mixtures, and one or more chromatic colorant-based mixtures. The white colorant-based mixtures include one or more mixtures of the white colorant plus the clear vehicle (in varying ratios for each mixture). The black colorant-based mixtures include one or more mixtures of the black colorant plus the clear vehicle (in varying ratios for each mixture) and one or more mixtures of the black colorant plus the white colorant plus the clear vehicle (in varying ratios for each mixture). The chromatic colorant-based mixtures include, for each chromatic colorant, one or more mixtures of the chromatic colorant plus the clear vehicle (in varying ratios for each mixture); one or more mixtures of the chromatic colorant plus the white colorant plus the clear vehicle (in varying ratios for each mixture); and one or more mixtures of the chromatic colorant plus the white colorant plus the black colorant plus the clear vehicle (in varying ratios for each mixture).

Having prepared or received the set of colorant mixtures, the method 100 proceeds to step 106, where each colorant mixture in the set of colorant mixtures is applied to a black substrate and to a white substrate (e.g., on a standard black/white chart). This produces a first set of substrates from which calibration data can be obtained.

In step 108, the method 100 measures (e.g., using a spectrophotometer) the reflectance of each colorant mixture as applied to the first set of substrates. This produces, for each colorant mixture, at least two reflectance measurements: a first reflectance measurement of the colorant mixture on the black substrate and a second reflectance measurement of the colorant mixture on the white substrate.

In step 110, the method 100 calculates, for each colorant mixture in the set of colorant mixtures, absorption (K) and scattering (S) values, in accordance with the two reflectance measurements obtained in step 108. In one embodiment, the K and S values are obtained from the two reflectance measurements using the two-constant Kubelka-Munk model with incomplete hiding (e.g., as described by H. S. Shah et al. in "Kubelka-Munk Analysis of Absorptance in the Presence of Scattering Including Surface-Reflection Correction to Transmittance," Color Research and Application, Vol. 10 (1985), pp. 26-31), which is herein incorporated by reference in its entirety. In a further embodiment, the K and S values are also calculated for the colorant concentrations in each of the colorant mixtures in the set of colorant mixtures.

In step 112, the method 100 stores (e.g., in a database) the K and S values and the colorant concentrations associated with each of the colorant mixtures in the first set of colorant mixtures.

In step 114, the method 100 applies each colorant mixture in the set of colorant mixtures to one or more absorbent substrates of particular types (e.g., if the absorbent substrates are wood, these may include pine, cedar, birch, etc.). This produces a second set of substrates from which calibration data can be obtained. In addition, the second set of substrates comprises a bare absorbent substrate (i.e., an absorbent substrate to which no colorant mixture has been applied) for each type of absorbent substrate to which the colorant mixtures are applied. In other words, if the second set of substrates includes a colorant mixture that is applied to a pine wood substrate, a bare pine wood substrate is also included in the second set of substrates.

In step 116, the method 100 measures (e.g., using a spectrophotometer) the reflectance of each colorant mixture as applied to the second set of substrates. This produces, for each combination of colorant mixture and absorbent substrate type, one reflectance measurement. In addition, a reflectance measurement is taken for each bare absorbent substrate in the second set of substrates.

In step 118, the method 100 calculates, for each combination of colorant mixture and absorbent substrate, absorption (K) and scattering (S) values. In one embodiment, the method 100 uses an approximation discussed in greater detail below in connection with EQN. 1 to derive the values for K and S. Using this approximation, it is possible to derive K with a one-dimensional zero-solver, using the measurement and a approximated value of S, evaluated from the known recipes of the colorant mixtures.

In step 120, the method 100 stores (e.g., in a database) the K and S values and the colorant concentrations associated with each of combination of colorant mixture and absorbent substrate. The method 100 then terminates in step 122.

Thus, the method 100 generates a plurality of "points" that may be used to populate a database, where each point represents a "recipe," i.e., the loadings or gram fractions of various colorant components arranged in the order '(clear, colorant$_1$, colorant$_2$, . . . , colorant$_n$).' The vector is a vector of loadings, designated by c. Thus, the point representing a given sample for 'colorant$_i$' is on the axis '(clear, colorant$_i$).'

In one embodiment of the method 100, the method 100 stores a user-provided mixture of clear vehicle plus multiple colorants as a point in the database. Such points represent what are referred to as "full recipes," since they include multiple colorants and thus do not reside on an axis. These mixtures are calibrated in a manner similar to that described above for the clear vehicle plus one colorant mixtures.

Figure 2:
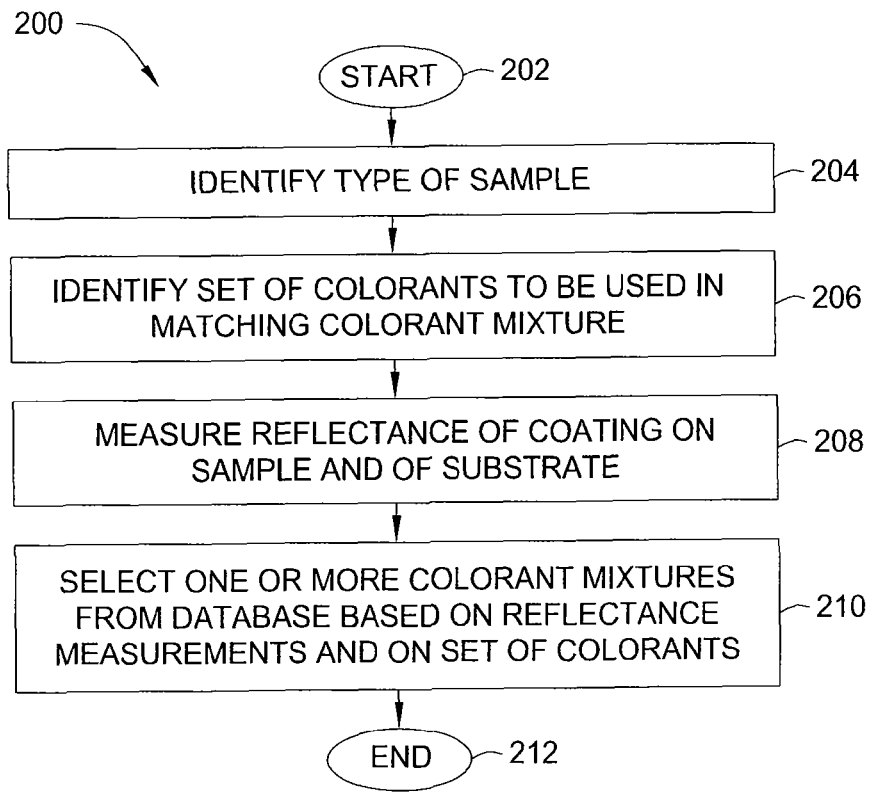
FIG. 2 is a flow diagram illustrating one embodiment of a method for matching the color of a coating on a user-provided sample substrate to one or more colorant mixtures or "points" in a database of calibrated colorant mixtures, according to the present invention.

FIG. 2 is a flow diagram illustrating one embodiment of a method 200 for matching the color of a coating on a user-provided sample to one or more colorant mixtures or "points" in a database of calibrated colorant mixtures, according to the present invention. In one embodiment, the method 200 makes use of the stored calibration data (e.g., K and S values and colorant concentrations) generated by the method 100, described above.

The method 200 is initialized at step 202 and proceeds to step 204, where the method 200 identifies the substrate type of the sample (e.g., type of wood), so that the subsequent procedure uses only the portions of the calibration data (discussed above) that are based on the same type of substrate. The substrate type may be identified indirectly based on user input (e.g., the user says the substrate type is pine) or directly based on measurement of the sample (e.g., using a spectrophotometer). For example, the method 200 may identify the type of the substrate based on the ΔH between the sample and the calibration data. ΔH is a Commission Internationale de l'Eclairage (CIE)-defined quantity that compares two colors (i.e., colloquially, the hue difference between two colors). More specifically, ΔH is the total difference between the two colors (ΔE), minus the lightness difference (ΔL), minus the chroma difference (←C), being evaluated as:

$$\sqrt{\Delta E^2 - \Delta L^2 - \Delta C^2}.$$

ΔH is more fully described in ASTM International, D 2244-07, "Standard Practice for Calculation of Color Tolerances and Color Differences from Instrumentally Measured Color Coordinates," ASTM International, 2007, which is herein incorporated by reference in its entirety.

Having identified the substrate type, the method 200 proceeds to step 206 and identifies a set of one or more colorants to be used in matching colorant mixtures from the database to the colorant mixture coating the sample. In other words, any colorant mixture or point from the database that is ultimately matched to the coating on the sample should include at least one of the colorants from the identified set. In one embodiment, the set of colorants is specified by the user, for example based on heuristics such as the chemical or physical properties of the desired colorant mixture. In one embodiment, the colorants available for inclusion in the set of colorants include the white colorant, the black colorant, and the chromatic colorants. In a further embodiment, the identified set of colorants also includes user-specified guidelines such as a minimum and/or maximum number of colorants from the set of colorants that must be used in each colorant mixture or point that is matched to coating on the sample. In a further embodiment still, the user-specified guidelines also include a required contrast ratio (i.e., ratio of luminance over black to luminance over white) for each colorant mixture or point that is matched to the coating on the sample.

In step 208, the method 200 measures the reflectance of the coating on the sample, as well as the reflectance of the substrate. In one embodiment, the reflectance measurements are averaged over several spatially separated readings to compensate for variations in two-dimensional texture or pattern (e.g., wood grain) of the substrate.

In step 210, the method 200 selects one or more colorant mixtures or points from the database, based on the reflectance measurements made in step 208 and on the set of colorants identified in step 206. In one embodiment, the one or more colorant mixtures includes the N (N>0) points that have the smallest ΔE (i.e., color difference) relative to the coating on the sample. In one embodiment, the reflectance measurements of the points in the database are used to adjust the K and S values from the standard calibration process (described with respect to FIG. 1), so the effect of the substrate on the color appearance is taken into account. Adjustment of the K and S values is discussed more fully below.

The method 200 then terminates in step 212.

As discussed above, the method 200 may be used to match the color of a coating on a sample to one or more points in a database of colorant mixtures. In one embodiment, some of the points in the database may represent colorant mixtures including multiple colorants. In addition, the method 200 may account for multiple colorants in making this match.

Consider, for example a formula $\vec{c}=[c_1, c_2, \ldots, c_N]$ representing a colorant mixture with N colorants, where $c_i$ is the concentration of the ith colorant in the colorant mixture. Each point in the database has a formula $\vec{c}$ and an associated reflectance measurement ($R(\lambda)$). In one embodiment, there is only one reflectance measurement for each point.

At each wavelength $\lambda$, one can synthesize the K and S values of the point from $\vec{c}$ as $K_{syn}(\vec{c}, \lambda)$ and $S_{syn}(\vec{c}, \lambda)$, where the subscript "syn" refers to the fact that the K and S values are synthesized. From the measurement $R(\lambda)$, one can calculate a K/S value, $K_{bat}/S_{bat}(\vec{c},\lambda)$, where the subscript "bat" refers to the fact that the K and S values relate to a batch of colorant mixture. With a single reflectance measurement, one is not able to calculate $K_{bat}(\vec{c},\lambda)$ and $S_{bat}(\vec{c},\lambda)$ respectively.

The additive correction factors for K and S can thus be calculated as:

$$\Delta K = \frac{K_{bat}}{S_{bat}}(\vec{c}, \lambda) \cdot S_{syn}(\vec{c}, \lambda) - K_{syn}(\vec{c}, \lambda) \text{ and } \Delta S = 0 \quad \text{(EQN. 1)}$$

In the above, an approximation is made that $S_{bat}(\vec{c},\lambda) \approx S_{syn}(\vec{c},\lambda)$. Using this approximation, it is possible to derive $K_{bat}$ with a one-dimensional zero-solver, using the measurement $R(\lambda)$ and the value of $S_{bat}$.

Assuming that a point having a formula $\vec{c}_0$ has been obtained by matching a given target reflectance $R_T(\lambda)$ (obtained from measurement of the sample) using the calibration data, and that M points are available in the selected colorant mixtures, the following calculations would be performed by the method 200 in step 210:

First, for each of the M points, $\Delta K(\vec{c}_j, \lambda)=1, 2, \ldots, M$ is calculated, for example using EQN. 1.

Second, a weighted additive correction factor is calculated from all of the M points. In one embodiment, the weighted additive correction factor is calculated as:

$$G(\vec{c}_0, \lambda) = \frac{\sum_{j=1}^{M} \frac{1}{\|\vec{c}_j - \vec{c}_0\|} \cdot \Delta K(\vec{c}_j, \lambda)}{\sum_{j=1}^{M} \frac{1}{\|\vec{c}_j - \vec{c}_0\|}}; \quad \text{(EQN. 2)}$$

where $\|\vec{c}_j - \vec{c}_0\|$ is the distance between the formulas $\vec{c}_j$ and $\vec{c}_0$ in the concentration space. In other embodiments, however, other multi-dimensional approximation models (such as single interpolation or radial basis functions) may be used to calculate the weighted additive correction factor.

Finally, the coating on the sample is matched again by correcting the K value. In one embodiment, the following correction on the K value is used (although other multi-dimensional approximation models may be used to correct K):

$$K'_{syn}(\vec{c},\lambda) = K_{syn}(\vec{c},\lambda) + G(\vec{c}_0, \lambda) \quad \text{(EQN. 3)}$$

To simplify the description, only database points are used in the following example. The same procedures can be applied for any number of points. Moreover, EQNs. 2 and 3 can be modified to correct for S as well as for K (by replacing K with S in the equations).

Figure 3:
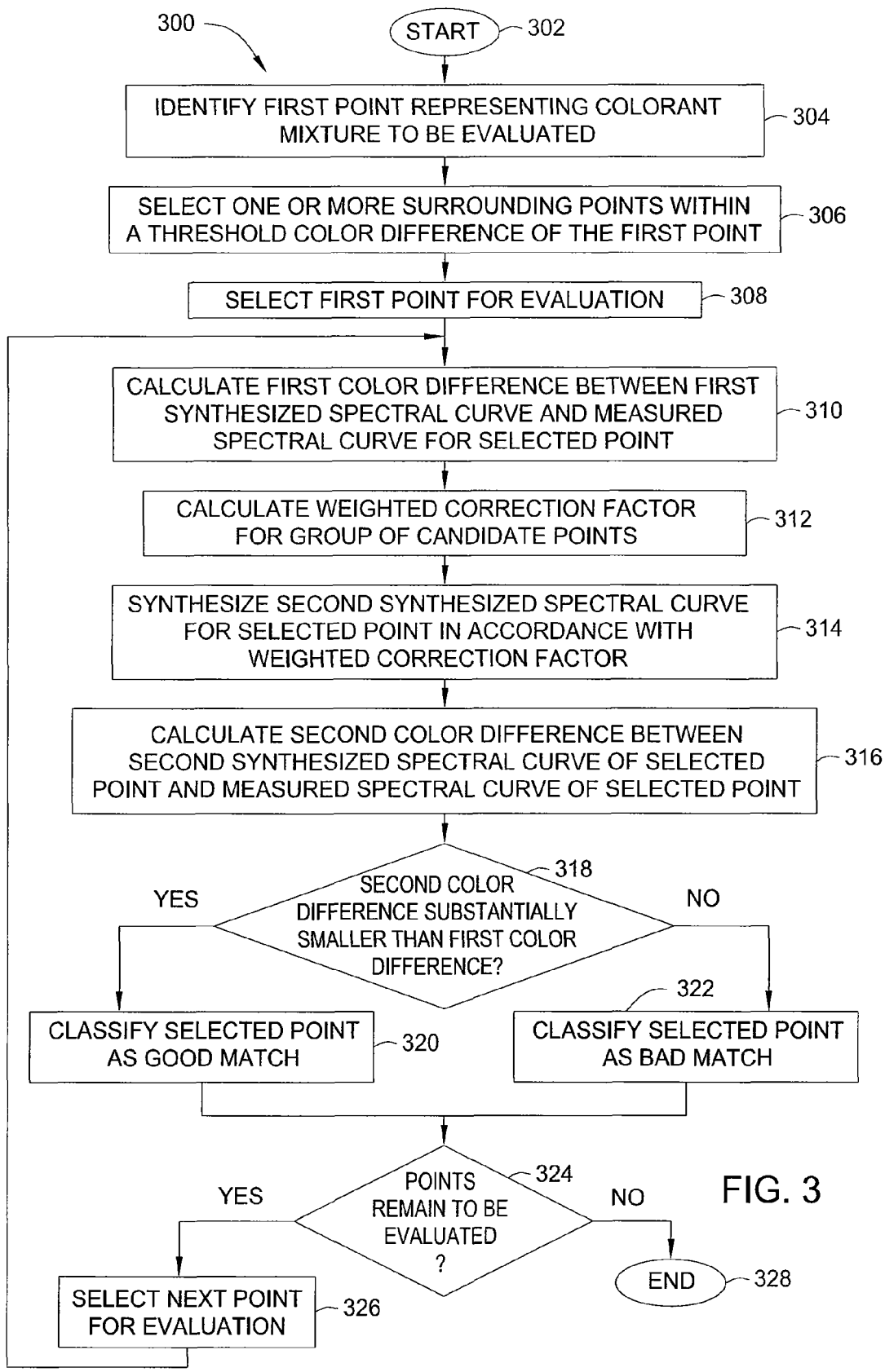
FIG. 3 is a flow diagram illustrating one embodiment of a method for evaluating a database point representing a colorant mixture, according to the present invention.

FIG. 3 is a flow diagram illustrating one embodiment of a method 300 for evaluating a database point representing a colorant mixture, according to the present invention. In particular, the method 300 presents a method for evaluating the database point as a potential match to a coating on a sample. As such, the method 300 may be implemented in accordance with step 210 of the method 200, discussed above.

Figure 4:
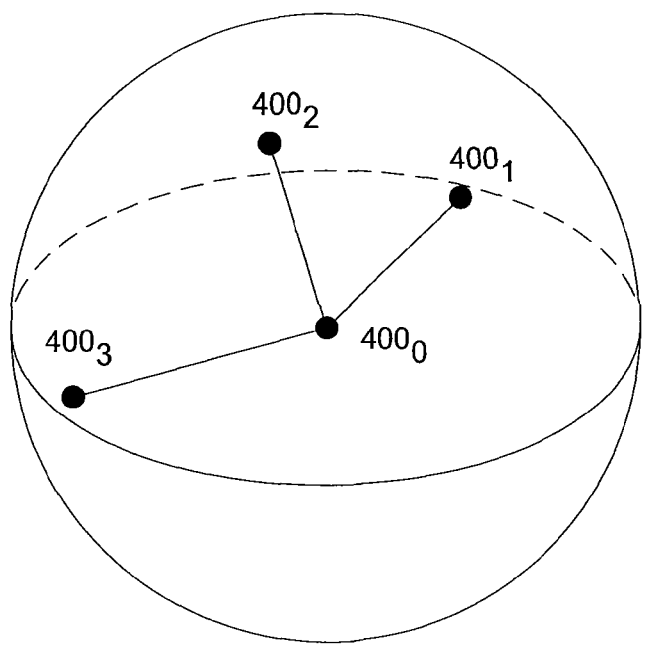
FIG. 4 is a schematic diagram illustrating a plurality of exemplary points in a database of colorant mixtures, where each of the points represents a different colorant mixture.

FIG. 4 is a schematic diagram illustrating a plurality of exemplary points $400_0$-$400_3$ (hereinafter collectively referred to as "points 400") in a database of colorant mixtures, where each of the points represents a different colorant mixture. Although FIG. 4 illustrates only four points, it will be appreciated that the database may contain any number of such points; the number four is used merely for ease of explanation. Reference may be made to FIGS. 3 and 4 simultaneously to illustrate the concepts of the method 300.

The method 300 is initialized at step 302 and proceeds to step 304, where the method 300 identifies a first point in the database, where the point represents a first colorant mixture in the database. The method 300 is invoked to evaluate the first point as a potential match to a coating on a sample. In FIG. 4, the first point is designated as point $400_0$.

In step 306, the method 300 selects a set of one or more surrounding points in the database within a predefined threshold color difference ($\Delta E$) of the first point. For example, if the coating on the sample were a wood stain, a suitable threshold $\Delta E$ might be approximately twenty-five. As an example, FIG. 4 assumes that only three points (i.e., $400_1$, $400_2$ and $400_3$) are found within the threshold $\Delta E$ of the first point $400_0$. The first point and the one or more surrounding points selected in step 306 together comprise a group of candidate points.

In step 308, the method selects the first point as a selected point for evaluation. The method 300 then proceeds to step 310 and calculates the color difference ($\Delta E_0$) between a first synthesized spectral curve and the measured spectral curve for the selected point. In one embodiment, both the first synthesized spectral curve and the measured spectral curve are given by the calibration data associated with the selected point (e.g., as discussed with respect to the method 100). In one embodiment, this calculation involves no measurements related to any other points in the database.

In step 312, the method 300 calculates the weighted correction factor for the group of candidate points. Referring again to the example illustrated in FIG. 4, this weighted correction factor is, in one embodiment, calculated using EQN. 2 as:

$$G(\vec{c}_0, \lambda) = \frac{\sum_{j=1}^{3} \frac{1}{\|\vec{c}_j - \vec{c}_0\|} \cdot \Delta K(\vec{c}_j, \lambda)}{\sum_{j=1}^{3} \frac{1}{\|\vec{c}_j - \vec{c}_0\|}}$$

where $\vec{c}_0$ is the formula of the first point (e.g., point $400_0$ in FIG. 4) and $\vec{c}_j$ are the formulas of the remaining points in the set of candidate points (e.g., points $400_1$, $400_2$, and $400_3$ in FIG. 4). The term $G(\vec{c}_0, \lambda)$ relates only to the first point.

In step 314, the method 300 synthesizes a second (new) synthesized spectral curve for the selected point, in accordance with the weighted correction factor. In one embodiment, the second synthesized spectral curve is synthesized based on a corrected absorption (K) value for the selected point, which is derived using the weighted correction factor. In one embodiment, the corrected K value is derived from the weighted correction factor in accordance with EQN. 3 as:

$$K°_{syn}(\vec{c}_0,\lambda)=K_{syn}(\vec{c}_0,\lambda)+G(\vec{c}_0,\lambda)$$

In this example, the selected point is assumed to be the first point (as indicated by the subscript 0); however, similar math holds for evaluation of the remainder of the candidate points.

In step 316, the method 300 calculates a second color difference ($\Delta E_0'$) between the second synthesized spectral curve of the selected point and the measured spectral curve of the selected point.

In step 318, the method 300 determines whether the second color difference $\Delta E_0'$ calculated in step 316 is greater than the first color difference $\Delta E_0$ calculated in step 310 by some threshold amount (e.g., at least one to two times greater). If the method 300 concludes in step 318 that the second color difference $\Delta E_0'$ is smaller than the first color difference $\Delta E_0$ by the threshold amount, then the method 300 proceeds to step 320 and classifies the selected point as a good match to the coating on the sample substrate.

Alternatively, if the method 300 concludes in step 318 that the second color difference $\Delta E_0'$ is not smaller than the first color difference $\Delta E_0$ by the threshold amount (e.g., at least three to four times greater than $\Delta E_0$), then the method 300 proceeds to step 322 classifies the selected point as a bad match to the coating on the sample substrate.

In step 324, the method 300 determines whether there are any points remaining to be evaluated in the group of candidate points. If the method 300 concludes in step 324 that there is at least one remaining candidate point, the method 300 proceeds to step 326 and selects a next point as the selected point for evaluation before returning to step 310 and proceeding as described above.

Alternatively, if the method 300 concludes in step 324 that there are no remaining candidate points, the method 300 terminates in step 328.

The method 300 therefore associates each candidate point with two color difference values, $\Delta E_i$ and $\Delta E_i'$ (i=0, 1, ..., N). As discussed above, from these values, one can assess the "goodness" of each candidate point as a match to the sample.

Figure 5:
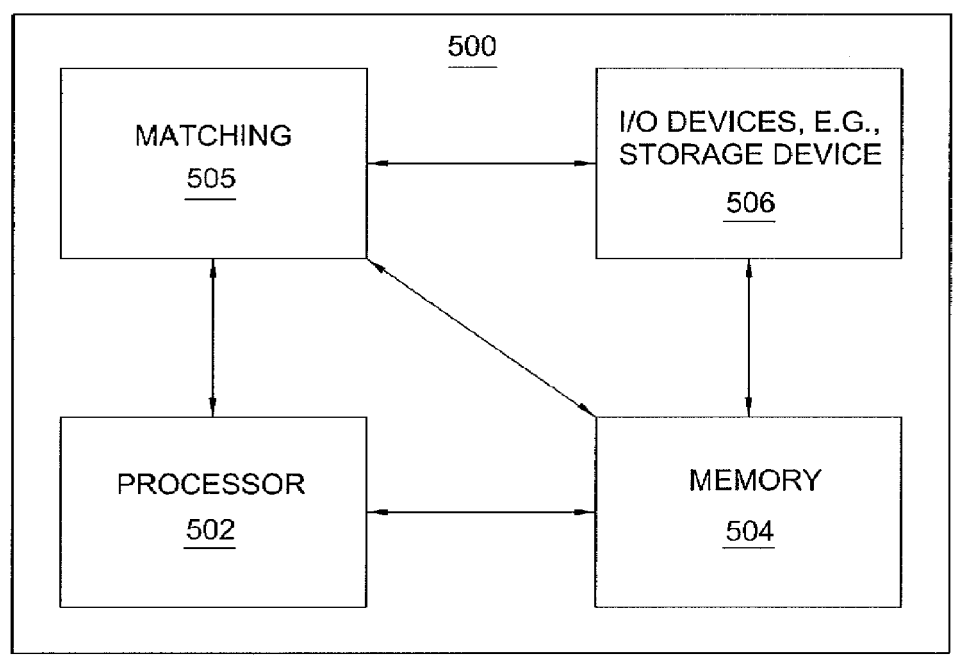
FIG. 5 is a high level block diagram of the present invention implemented using a general purpose computing device.

FIG. 5 is a high level block diagram of the present invention implemented using a general purpose computing device 500. It should be understood that embodiments of the invention can be implemented as a physical device or subsystem that is coupled to a processor through a communication channel. Therefore, in one embodiment, a general purpose computing device 500 comprises a processor 502, a memory 504, a matching module 505, and various input/output (I/O) devices 506 such as a display, a keyboard, a mouse, a modem, a spectrophotometer, and the like. In one embodiment, at least one I/O device is a storage device (e.g., a disk drive, an optical disk drive, a floppy disk drive).

Alternatively, embodiments of the present invention (e.g., matching module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the matching module for matching colorant mixtures to sample substrates described herein with reference to the preceding Figures can be stored on a computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Embodiments of the present invention create a bridge between standard recipe matching techniques that use normally calibrated components, and extended recipe matching techniques that use added multidimensional known recipes. After the calibration procedure (e.g., as discussed with respect to FIG. 1), which introduces the axis points (representing recipes that comprise a clear vehicle and only one colorant), embodiments of the invention immediately achieve an improvement in the matching process. Matching techniques using conventionally calibrated data will typically take much more time to arrive at a match (e.g., weeks or months), because possible new points can be introduced to the database only at each correction step. Embodiments of the present invention arrive at a match much more quickly, because the process doesn't create as many samples (points) for calibration.

Although various embodiments which incorporate the teachings of the present invention have been shown and described in detail herein, those skilled in the art can readily devise many other varied embodiments that still incorporate these teachings.

What is claimed is:

1. A method for matching a color of a sample, the method comprising:
   generating a plurality of recipes, each of the plurality of recipes representing a mixture of one colorant and a clear vehicle and defining a concentration of the one colorant and a concentration of the clear vehicle;
   applying each of the plurality of recipes to one or more absorbent substrates;
   determining an absorption value and a scattering value for each of the plurality of recipes as applied to the one or more absorbent substrates; and
   storing the plurality of recipes in a database, where each of the plurality of recipes is stored with an associated absorption value and an associated scattering value; and
   using the plurality of recipes stored in the database to match the color of the sample.

2. The method of claim 1, wherein the one colorant is a white colorant, a black colorant, or a chromatic colorant.

3. The method of claim 1, wherein the using comprises:
   selecting a first recipe from among the plurality of recipes stored in the database; and
   evaluating a quality of the first recipe as a match to the color of the sample.

4. The method of claim 3, wherein the evaluating comprises:
   calculating a first color difference between a first synthesized spectral curve of the first recipe and a measured spectral curve of the first recipe;

calculating a second color difference between a second synthesized spectral curve of the first recipe and the measured spectral curve of the first recipe; and classifying the quality in accordance with the first color difference and the second color difference.

5. The method of claim 4, wherein the first synthesized spectral curve is associated with the first recipe in the database.

6. The method of claim 4, wherein the classifying comprises:

concluding that the quality is good if the second color difference is smaller than the first color difference by a threshold amount.

7. The method of claim 4, wherein the classifying comprises:

concluding that the quality is bad if the second color difference is not smaller than the first color difference by a threshold amount.

8. The method of claim 4, wherein the second synthesized spectral curve is obtained by:

calculating a correction factor for a group of one or more recipes selected from the plurality of recipes, where the group of one or more recipes includes the first recipe;

calculating a corrected absorption value for the first recipe in accordance with the correction factor, where the corrected absorption value corrects an absorption associated with the first recipe in the database; and generating the second synthesized spectral curve in accordance with the corrected absorption value.

9. The method of claim 8, wherein the group of one of more recipes is selected by:

identifying at least one recipe from among the plurality of recipes that exhibits a color difference within a predefined threshold relative to the first recipe.

10. A non-transitory computer readable storage medium containing an executable program for matching a color of a sample, where the program when executed by a processor performs steps comprising:

generating a plurality of recipes, each of the plurality of recipes representing a mixture of one colorant and a clear vehicle and defining a concentration of the one colorant and a concentration of the clear vehicle;

applying each of the plurality of recipes to one or more absorbent substrates;

determining an absorption value and a scattering value for each of the plurality of recipes as applied to the one or more absorbent substrates; and storing the plurality of recipes in a database, where each of the plurality of recipes is stored with an associated absorption value and an associated scattering value; and using the plurality of recipes stored in the database to match the color of the sample.

11. The non-transitory computer readable storage medium of claim 10, wherein the one colorant is a white colorant, a black colorant, or a chromatic colorant.

12. The non-transitory computer readable storage medium of claim 10, wherein the using comprises:

selecting a first recipe from among the plurality of recipes stored in the database; and evaluating a quality of the first recipe as a match to the color of the sample.

13. The non-transitory computer readable storage medium of claim 12, wherein the evaluating comprises:

calculating a first color difference between a first synthesized spectral curve of the first recipe and a measured spectral curve of the first recipe;

calculating a second color difference between a second synthesized spectral curve of the first recipe and the measured spectral curve of the first recipe; and classifying the quality in accordance with the first color difference and the second color difference.

14. The non-transitory computer readable storage medium of claim 13, wherein the first synthesized spectral curve is associated with the first recipe in the database.

15. The non-transitory computer readable storage medium of claim 13, wherein the classifying comprises:

concluding that the quality is good if the second color difference is smaller than the first color difference by a threshold amount.

16. The non-transitory computer readable storage medium of claim 13, wherein the classifying comprises:

concluding that the quality is bad if the second color difference is not smaller than the first color difference by a threshold amount.

17. The non-transitory computer readable storage medium of claim 13, wherein the second synthesized spectral curve is obtained by:

calculating a correction factor for a group of one or more recipes selected from the plurality of recipes, where the group of one or more recipes includes the first recipe;

calculating a corrected absorption value for the first recipe in accordance with the correction factor, where the corrected absorption value corrects an absorption associated with the first recipe in the database; and generating the second synthesized spectral curve in accordance with the corrected absorption value.

18. The non-transitory computer readable storage medium of claim 17, wherein the group of one of more recipes is selected by:

identifying at least one recipe from among the plurality of recipes that exhibits a color difference within a predefined threshold relative to the first recipe.

19. A system for matching a color of a sample, where the system comprises:

means for generating a plurality of recipes, each of the plurality of recipes representing a mixture of one colorant and a clear vehicle and defining a concentration of the one colorant and a concentration of the clear vehicle;

means for applying each of the plurality of recipes to one or more absorbent substrates;

means for determining an absorption value and a scattering value for each of the plurality of recipes as applied to the one or more absorbent substrates;

means for storing the plurality of recipes in a database, where each of the plurality of recipes is stored with an associated absorption value and an associated scattering value; and means for using the plurality of recipes stored in the database to match the color of the sample.

20. The system of claim 19 wherein the means for using comprises:

means for selecting a first recipe from among the plurality of recipes stored in the database; and means for evaluating a quality of the first recipe as a match to the color of the sample.

* * * * *

UNITED STATES PATENT AND TRADEMARK OFFICE
CERTIFICATE OF CORRECTION

PATENT NO. : 8,108,169 B2
APPLICATION NO. : 12/413190
DATED : January 31, 2012
INVENTOR(S) : Denis Martin Page 1 of 1

It is certified that error appears in the above-identified patent and that said Letters Patent is hereby corrected as shown below:

In the Specification

Col. 4, Line 14: Delete "(←C)," and insert -- ($\Delta C$), --, therefor.

Col. 7, Line 10: Delete "$K^{\circ}_{syn}(\vec{c}_0,\lambda)=K_{syn}(\vec{c}_0,\lambda)+G(\vec{c}_0,\lambda)$," and insert -- $K'_{syn}(\vec{c}_0,\lambda)=K_{syn}(\vec{c}_0,\lambda)+G(\vec{c}_0,\lambda)$ --, therefor.

In the Claims

Col. 8, Line 50: In Claim 1, after "substrates;" delete "and".

Col. 9, Line 47: In Claim 10, after "substrates;" delete "and".

Signed and Sealed this
Twenty-second Day of April, 2014

Michelle K. Lee
*Deputy Director of the United States Patent and Trademark Office*